J. F. & H. E. DODGE.
TRANSMISSION GEAR MECHANISM.
APPLICATION FILED AUG. 19, 1914.

1,207,722.

Patented Dec. 12, 1916.
3 SHEETS—SHEET 2.

Witnesses

Inventors
John F. Dodge
Horace E. Dodge
attorneys

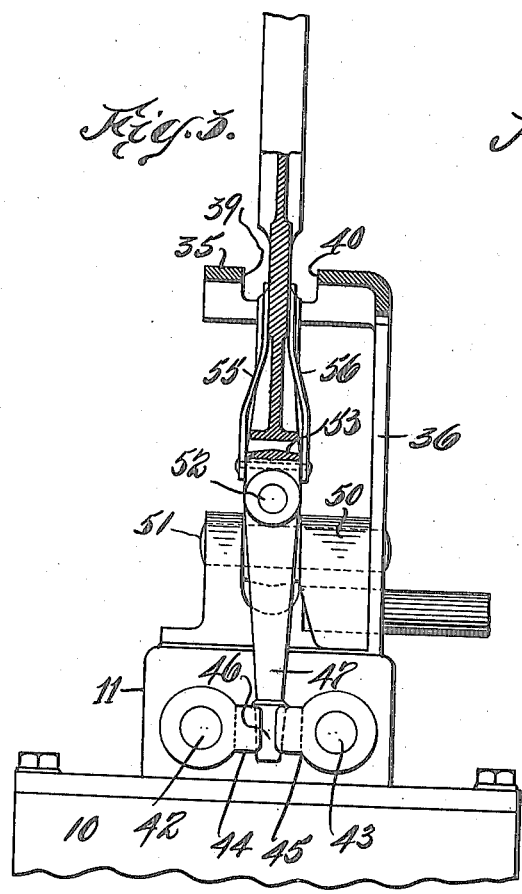
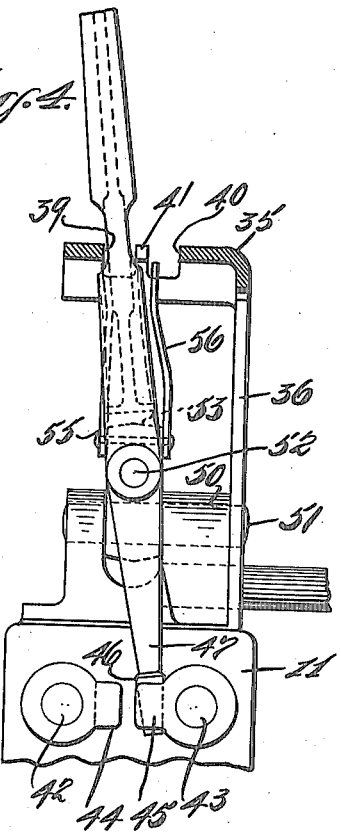
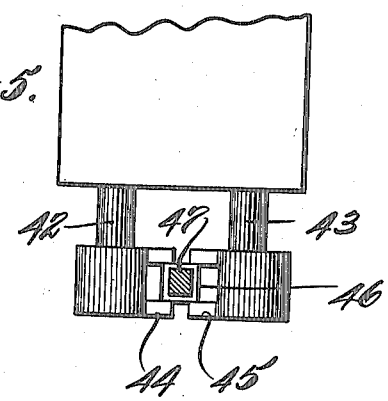
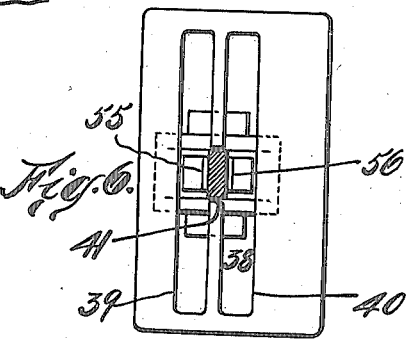

UNITED STATES PATENT OFFICE.

JOHN F. DODGE, OF DETROIT, AND HORACE E. DODGE, OF GROSSE POINTE, MICHIGAN, ASSIGNORS TO DODGE BROTHERS, OF DETROIT, MICHIGAN, A CORPORATION OF MICHIGAN.

TRANSMISSION-GEAR MECHANISM.

1,207,722.   Specification of Letters Patent.   Patented Dec. 12, 1916.

Application filed August 19, 1914.   Serial No. 857,483.

*To all whom it may concern:*

Be it known that we, JOHN F. DODGE and HORACE E. DODGE, citizens of the United States, residing, respectively, at Detroit and Grosse Pointe, Michigan, have invented certain new and useful Improvements in Transmission-Gear Mechanism, of which the following is a clear, full, and exact description.

This invention relates to improvements in transmission gear mechanism, more particularly for use in automobiles, and one of the objects of the invention is to provide simple and efficient means for directly connecting up the drive and driven shafts for high speed and for changing the speed.

Another object of the invention is to provide improved means for mounting the reversing gear.

These being among the objects of the present invention, the same consists of certain features of construction and combinations of parts to be hereinafter described and then claimed with reference to the accompanying drawings illustrating a suitable embodiment of the invention, in which—

Figure 1:
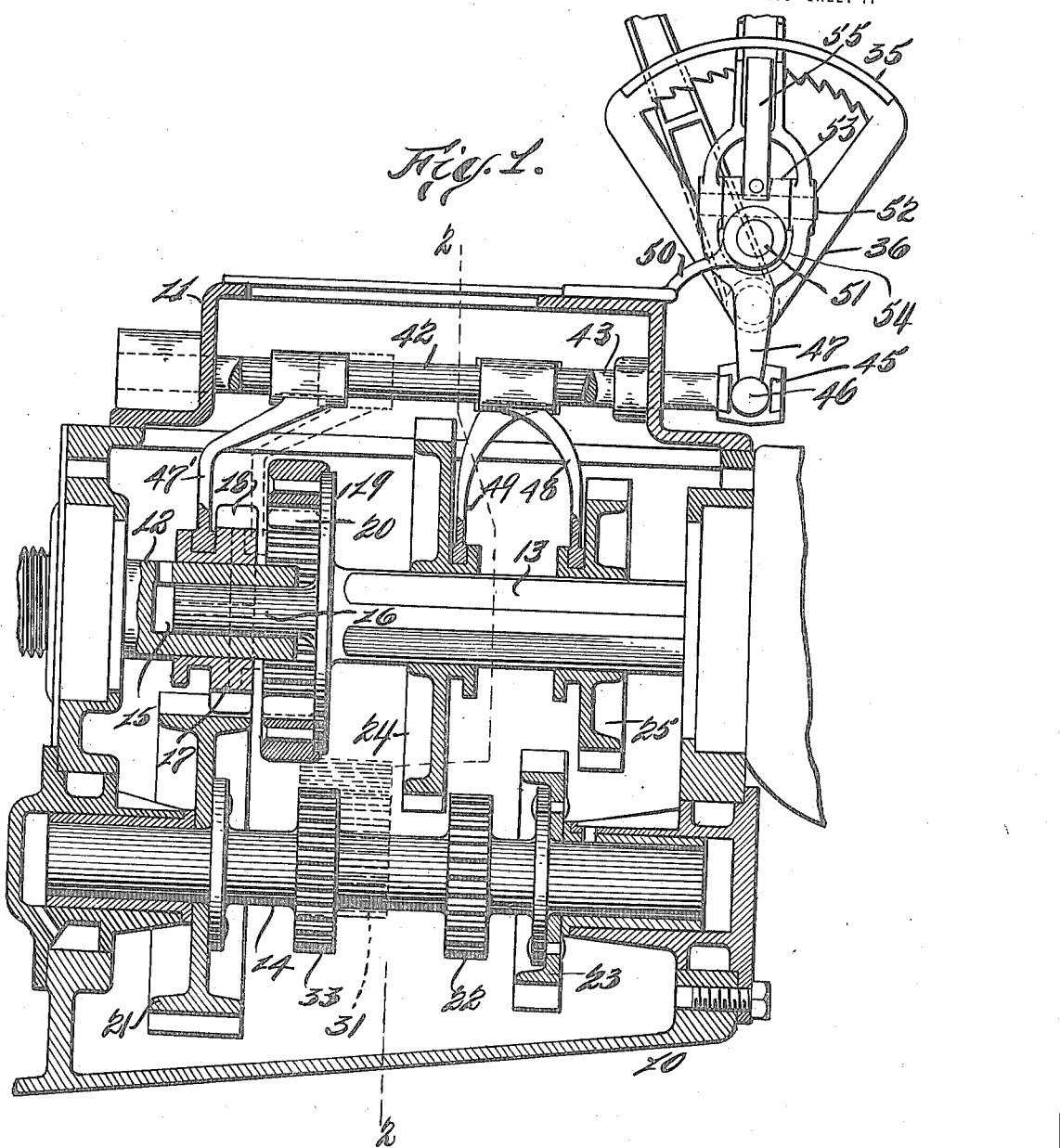
Figure 2:
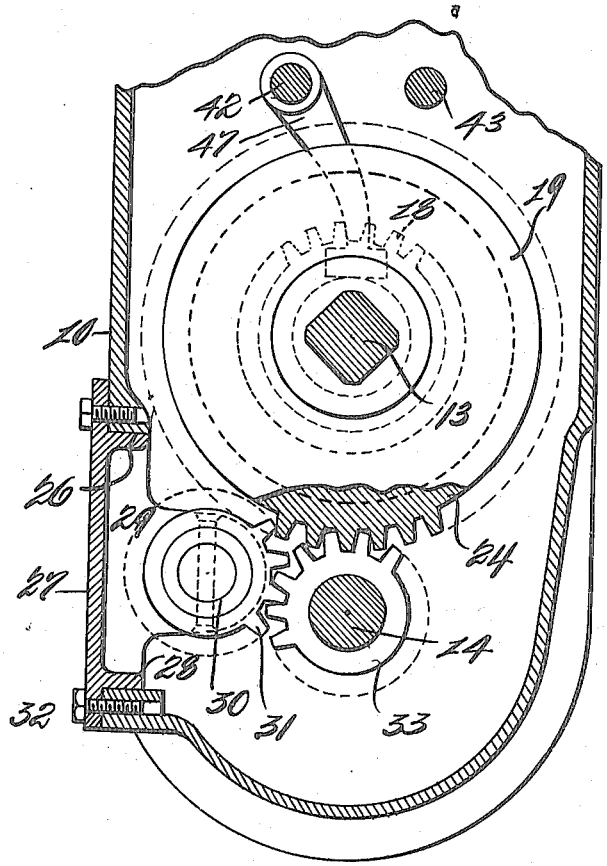
Figure 7:
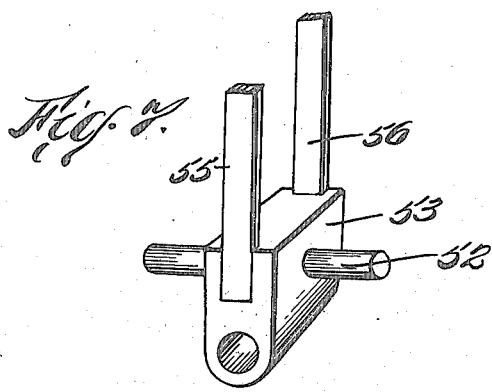

Figure 1 is a longitudinal section of the gear mechanism including a side elevation of the controlling means or controlling lever mechanism; Fig. 2 is a transverse section on the line 2—2 Fig. 1 illustrating more particularly the reversing mechanism; Figs. 3 and 4 respectively are side views partly in section of the controlling lever mechanism, Fig. 3 showing the same in neutral using position, and Fig. 4 showing the same shifted; Fig. 5 is a detail plan partly in section of a part of the controlling mechanism; Fig. 6 is a plan of the guide-plate for the controlling lever, showing the latter in section; and Fig. 7 is a detail perspective view of an improved link device employed in the control mechanism.

Referring to Figs. 1 and 2, the gears and the means for supporting the same will be understood. There is a gear casing 10 provided with a supplemental casing 11, which carries parts of the control mechanism. The drive-shaft 12 is adapted to be connected with the engine in any suitable manner, while alined therewith is a driven-shaft 13, both of which shafts are supported in suitable bearings in the casing 10. Adjacent the said shafts and also mounted in suitable bearings of the casing 10 is a counter-shaft 14. The end of the drive-shaft 12 is provided with an axial bore or recess 15 which provides a bearing for the adjacent end of the driven-shaft 16 which is inserted in said bore. Upon the drive-shaft 12 there is located a gear wheel 17 which is feathered to the shaft so that it is compelled to rotate therewith but which may be moved longitudinally of the shaft. The series of gear teeth 18 on gear 17 are located on the exterior or outer periphery thereof, and said gear 17 is thereby adapted to serve not only as an intermeshing gear but to constitute a clutch member. Rigidly mounted on the driven shaft 13 adjacent to the drive-shaft is the other clutch member 19 which is provided with an annular series of internal teeth 20. It will be seen that the clutch member 17 is adapted to be slid into the clutch member 19 so as to interlock therewith and to drive both of the shafts at the same rate of speed.

A companion gear 21 for clutch gear 17 is mounted rigidly upon the counter-shaft 14 which also carries rigidly mounted gears 22 and 23, which are of less diameter than the gear 21, and gear 22 is of less diameter than gear 23. The driven-shaft 13 is preferably squared in cross section so as to compel gears 24 and 25 mounted thereon to rotate therewith, while said gears are thereby adapted to be slid longitudinally of said shaft. Gears 22 and 24 are companion gears and when intermeshed are adapted to drive the driven-shaft at low speed, while gears 23 and 25 are companion gears and when intermeshed are adapted to drive said shaft at a speed intermediate thereof and the speed at which the drive and driven-shafts are connected for direct drive.

It will be seen that when the gear 17 is shifted so that the teeth thereof are pushed in between the teeth 20 on clutch member 19, the shafts 12, 13, are connected for direct drive at high speed, and that when the gear 17 is shifted out of engagement with the clutch member 19, the direct connection is broken and that the teeth 18 which theretofore clutched the two parts 17 and 19 together, are now intermeshed with the teeth of the counter-shaft gear 21 so that the drive is through the gear 21, through the counter-shaft 14 and through 13. If now the gear 24 be shifted on the drive-shaft so as to be brought into mesh with the gear 22 on the counter-shaft, the latter will cause the driven-shaft to be rotated at a lower rate of speed or at low speed. It will be noted that it is only necessary to shift the clutch gear 17 in one direction for a direct drive and in the opposite direction for a drive at a lower rate of speed, the clutch member 19 and the gear 21 remaining in their fixed positions on their respective shafts. It will also be clear that when the two shafts are connected for high speed, the countershaft is idle, so that friction in the transmission is reduced.

As shown in Fig. 2, the gear casing 10 is provided with an opening 26 which is closed by a cover-plate 27 which is provided with a flange 28 which fits around the edge of the opening, said plate also carrying a bracket 29. The pivot pin 30 of the reversing gear or idler 31 is mounted in said bracket 29 so that when the cover-plate is applied in position, the reversing gear 31 will be set in position as shown, it being secured stationarily in that position by means of suitable fastenings such as screw-bolts 32 which enter the cover-plate and the casing. In Fig. 1 it will be seen that the gear 24 is in an intermediate position. It can be moved in one direction so as to be brought in mesh with the gear 22 on the counter-shaft, or it may be moved in the opposite direction so as to be brought in mesh with the reversing gear 31. To this end the said reversing gear is set upon the pivot to one side of and parallel with the counter-shaft and it turns in a plane closer to the driven-shaft than does the counter shaft. A gear 33 is mounted rigidly on the counter-shaft and turns said reversing gear whenever the counter-shaft is rotated. The described removable cover plate permits easy removal in case of repair or replacement, while the opening 26 closed thereby serves as a hand hole.

The control mechanism is preferably of the type in which a guide-plate provided with an H slot or its equivalent is used. An improvement in this connection is shown herein which is reserved for a subsequent application and is described as follows: Referring to Figs. 1, 3 and 4, the guide-plate 35 is mounted on a suitable supporting frame 36, which is carried by a bracket 50. The control lever 47 extends upwardly through an H slot 38 in plate 35, in the form of the invention shown, which slot is provided with parallel ways 39 and 40 and with a transverse or connecting way 41.

The before mentioned supplemental casing 11 is provided with suitable bearings for longitudinally movable rods 42 and 43, one rod having a recessed lug 44 and the other a recessed lug 45, at corresponding ends of said rods. The lower end 46 of the controlling lever 47 is by means of the mounting for said lever located in position so that it may coöperate with said recessed lugs, that is to say, it may be moved into engagement with the recess of lug 44 or with the recess of lug 45 as shown in Fig. 5. The slide rod 42 carries arms 47' and 48 which are adapted at their free ends to engage in the grooved hubs of the gears 17 and 25, while an arm 49 on the other slide rod 43 engages at its free end with the grooved hub of gear 24. The said controlling lever 47 is preferably carried on two pivots 51 and 52, the pivot 52 being located above the pivot 51 and being positioned so that said pivots extend transversely of each other.

The pivot 51 connects a block or link 53 with the bracket 50, said block or link being positioned within an opening 54 in the lever. As shown more clearly in Fig. 7, said block or link 53 carries flat springs or spring fingers 55, 56, at opposite ends, the same being so positioned that their free ends will have spring contact with the opposite sides of the lever 47, or those sides of the lever which correspond with the opposite sides of the pivot pin 52. This being the case, it will be seen that when the springs are properly mounted and set, they will have a tendency to move the controlling lever to absolutely neutral position shown in Fig. 3, so that that portion of the lever which passes through the H slot will be set midway between the ends of the connecting way of said slot. By moving the lever to one side or the other of the H slot so as to pass into one of the parallel ways, the said lever will be swung upon the pivot 52, and as the block or link 53 cannot swing in that direction, one of the springs will be placed under tension. If in this position the said lever be released, it will be automatically returned to central position between the ends of the connecting way by the action of the deflected spring. As shown in Fig. 4, the other spring will not be deflected unless the lever is moved against it, in its direction. It will be noted that by reason of the location and action of the said springs 55 and 56, the ends thereof do not protrude through the guide-plate and consequently the clothing of a person cannot catch on the ends of said springs.

The double pivot arrangement described is advantageous in that by locating the transverse pivot 52 over the longitudinal pivot 51, the space in which one will have to move the lever in order to shift from one side of the quadrant to the other is reduced, and it gives the greatest leverage where the force required is the greatest; namely, in shifting the gears.

The method of shifting the lever for the purpose of obtaining the three different speeds will be obvious, as well as for obtaining the reverse rotation of the driven-shaft, but when the said lever is moved toward one end of one of the parallel ways it is shifted upon its pivot 51 and the gear mechanism is thereby conditioned for the appropriate speed, or the reverse. If, however, the machine is to be stopped, the lever is moved back toward the transverse connecting way 41 of the H slot. Should a careless operator leave the lever in position at one end of said slot, it might be accidentally shifted if it were not for the fact that when the lever is so positioned it is automatically returned to central neutral position between the ends of said connecting way.

It is obvious that the invention is susceptible of modification, as parts may be omitted, parts added, and parts substituted without departing from the spirit and scope thereof as expressed in the claims.

What we claim as new is:—

1. In a transmission gear mechanism, the combination of alined driving and driven shafts, a shiftable driving gear having external gear-teeth, and mounted to turn with but shiftable on said driving shaft, said gear constituting a clutch member, a companion clutch member therefor, mounted rigidly on said driven shaft, and having internal teeth adapted to receive said gear teeth between them and clutch said shafts together, and speed change gearing adapted to be driven by the said teeth of said gear when the said clutch connection is broken, and to transmit motion to said driven shaft, but at which time said companion clutch member is entirely inoperative as to any of said parts.

2. In a transmission gear mechanism, the combination of alined driving and driven shafts, a shiftable driving gear having external gear-teeth, and mounted to turn with but shiftable on said driving shaft, said gear constituting a clutch member, a companion clutch member therefor, acting on said driven shaft, and having internal teeth adapted to receive said gear teeth between them and clutch said shafts together, speed change gearing, adapted to be driven by the said teeth of said gear when the said clutch connection is broken and to transmit motion to said driven shaft, but at which time said companion clutch member is entirely inoperative as to any of the parts herein, and a reversing gear driven from said countershaft, said change gearing including a shiftable gear on said driven shaft which is engageable with said reversing gear.

3. In a transmission gear mechanism, the combination of alined driving and driven shafts, a shiftable driving gear having external gear-teeth, and mounted to turn with but shiftable on said driving shaft, said gear constituting a clutch member, a companion clutch member therefor, acting on said driven shaft, and having internal teeth adapted to receive said gear teeth between them and clutch said shafts together, a countershaft, gears of different diameter rigidly mounted thereon, one of said gears meshing with said driving clutch gear, and a gear rotatable with said driven shaft and shiftable to engage another of said gears on the countershaft, the said shiftable gears being mounted for relative movement on said alined shafts to the exclusion of any of such on said countershaft, a reversing gear mounted alongside said countershaft, and a countershaft gear meshing with said reversing gear, said driven-shaft gear being engageable with said reversing gear, and said countershaft and said reversing gear being idle when said clutch members are connected.

4. In a transmission gear mechanism, the combination of alined driving and driven shafts, a shiftable driving gear having external gear-teeth, and mounted to turn with but shiftable on said driving shaft, said gear constituting a clutch member, a companion clutch member therefor, acting on said driven shaft, and having internal teeth adapted to receive said gear teeth between them and clutch said shafts together, a countershaft, gears of different diameter rigidly mounted thereon, one of said gears meshing with said clutch gear, a gear rotatable with said driven shaft and shiftable to engage another of said gears on the countershaft, a pair of additional coöperating gears of different diameter than any of the other gears, respectively mounted rigidly on said countershaft and on, but shiftable with respect to, said driven shaft and said companion clutch member, the said shiftable gears being mounted for relative movement on said alined shafts to the exclusion of any of such on said countershaft, a reversing gear mounted alongside said countershaft, and a gear mounted rigidly on said countershaft and meshing with said reversing gear, one of said driven shaft gears being engageable with said reversing gear.

5. In a transmission gear mechanism, the combination of alined driving and driven shafts, a shiftable driving gear having external gear-teeth, and mounted to turn with but shiftable on said driving shaft, said gear constituting a clutch member, a companion clutch member therefor, acting on said driven shaft, and having internal teeth adapted to receive said gear teeth between them and clutch said shafts together, a countershaft, gears of different diameter rigidly mounted thereon, one of said gears meshing with said clutch gear, a gear rotatable with said driven shaft and shiftable to engage another of said gears on the countershaft, a pair of additional coöperating gears of different diameter than any of the other gears, and respectively mounted rigidly on said countershaft and on, but shiftable with respect to, said driven shaft, a reversing gear mounted alongside said countershaft, a countershaft gear meshing with said reversing gear; one of said driven-shaft gears being engageable with said reversing gear, and mechanism for shifting the said gears on said driving and driven-shafts for obtaining a direct drive and two additional speeds, comprising means for moving in the same direction, said driving clutch gear to connect the clutch, and one of said driven-shaft gears to disconnect it from its companion gear, and for moving the last mentioned driven-shaft gear into mesh with its said companion gear and said clutch gear over into mesh with its companion gear on the countershaft, and means for moving the other of said driven shaft gears into and out of mesh with its companion countershaft gear and said reversing gear, said countershaft and the gears thereon being idle when said clutch members are engaged.

6. In transmission gear mechanism, the combination of a casing, gearing arranged in said casing, a driving shaft extending through said casing, a removable support provided with means affixed to said casing and accessible from the outside of said casing for removing said support independently of said casing, a reversing gear in said casing and located on said removable support coöperatively with said gearing, and a driven shaft extending through said casing and rotatable in two directions from said driving shaft by said gearing and reversing gear.

7. In transmission gear mechanism, the combination of a casing having an opening, gearing arranged in said casing, a driving shaft extending through said casing, a cover-plate constituting a support applied removably to said casing, over said opening, a reversing gear in said casing and located on said removable plate coöperatively with said gearing, said reversing gear being smaller than said opening in said casing, and a driven shaft extending through said casing and rotatable in two directions from said driving shaft by said gearing and reversing gear.

8. In a transmission gear mechanism, the combination of a casing provided with an opening, alined driving and driven shafts, a shiftable driving gear having external gear-teeth, and mounted to turn with but shiftable on said driving shaft, said gear constituting a clutch member, a companion clutch member therefor, acting on said driven shaft, and having internal teeth adapted to receive said gear teeth between them and clutch said shafts together, a countershaft, gears of different diameter rigidly mounted thereon, one of said gears meshing with said clutch gear, a gear rotatable with said driven shaft and shiftable to engage another of said gears on the countershaft, a pair of additional coöperating gears of different diameter than any of the other gears, and respectively mounted rigidly on said countershaft and on, but shiftable with respect to, said driven shaft, a removable support covering said opening, said opening and said support being located in one of the lateral side walls of said casing opposite to said counter-shaft, a reversing gear mounted on said support alongside said countershaft, a countershaft gear meshing with said reversing gear, one of said driven-shaft gears being engageable with said reversing gear, all of said parts being mounted in said casing, and mechanism for shifting the said gears on said driving and driven-shafts, comprising means for moving in the same direction, said driving clutch gear to connect the clutch, and one of said driven-shaft gears to disconnect it from its companion gear, and for moving the last mentioned driven-shaft gear into mesh with its said companion gear and said clutch gear over into mesh with its companion gear on the countershaft, and means for moving the other of said driven shaft gears into and out of mesh with its companion countershaft gear and said reversing gear, said countershaft and the gears thereon being idle when said clutch members are engaged.

Signed at Detroit, Mich., this 31 day of July, 1914.

JOHN F. DODGE.
HORACE E. DODGE.

Witnesses:
W. R. WILSON,
G. W. MASON.